United States Patent
Shereyk et al.

Patent Number: 5,820,048
Date of Patent: Oct. 13, 1998

[54] SIDE LATCHING HINGE MECHANISM

[75] Inventors: David A. Shereyk, Homewood; Arnold DeCarlo, Manhattan, both of Ill.

[73] Assignee: Illinois Tool Works Inc., Glenview, Ill.

[21] Appl. No.: 629,734

[22] Filed: Apr. 9, 1996

[51] Int. Cl.[6] .................................................. F16L 3/22
[52] U.S. Cl. .................... 248/68.1; 248/71; 248/74.1; 24/487
[58] Field of Search ................... 248/49, 50, 65, 248/68.1, 74.1, 71, 544; 24/487, 30.5 R

[56] References Cited

U.S. PATENT DOCUMENTS

| | | | |
|---|---|---|---|
| 4,142,294 | 3/1979 | Adair | 24/487 X |
| 4,264,047 | 4/1981 | Nelson | 248/73 |
| 4,478,381 | 10/1984 | Pittion et al. | 248/71 |
| 4,536,924 | 8/1985 | Willoughby | 24/487 X |
| 4,650,925 | 3/1987 | Coldren | 24/487 X |
| 4,865,280 | 9/1989 | Wollar | 248/68.1 |
| 5,113,717 | 5/1992 | Plamper | 74/502.6 |
| 5,123,146 | 6/1992 | Olson | 24/487 X |
| 5,251,857 | 10/1993 | Grice et al. | 248/62 |
| 5,316,245 | 5/1994 | Ruckwardt | 248/68.1 |
| 5,385,373 | 1/1995 | Love | 24/487 X |
| 5,390,867 | 2/1995 | Hatano et al. | 248/73 |
| 5,535,969 | 7/1996 | Duffy, Jr. | 24/487 X |

*Primary Examiner*—Ramon O. Ramirez
*Assistant Examiner*—Long Dinh Phan
*Attorney, Agent, or Firm*—Schwartz & Weinrieb

[57] ABSTRACT

An improvement for a routing clip is provided by a hinge latch adjacent to the folded hinge portion thereof. The hinge latch includes a male latching member on one side of the hinge portion and a female latching member in a corresponding position on the other side of the hinge portion, both male and female latching members being on one side of the routing clip. When being engaged with the female latching member, the male latching member deflects in a direction transverse to its length to provide a more secure latching mechanism as a back-up to the hinge.

17 Claims, 9 Drawing Sheets

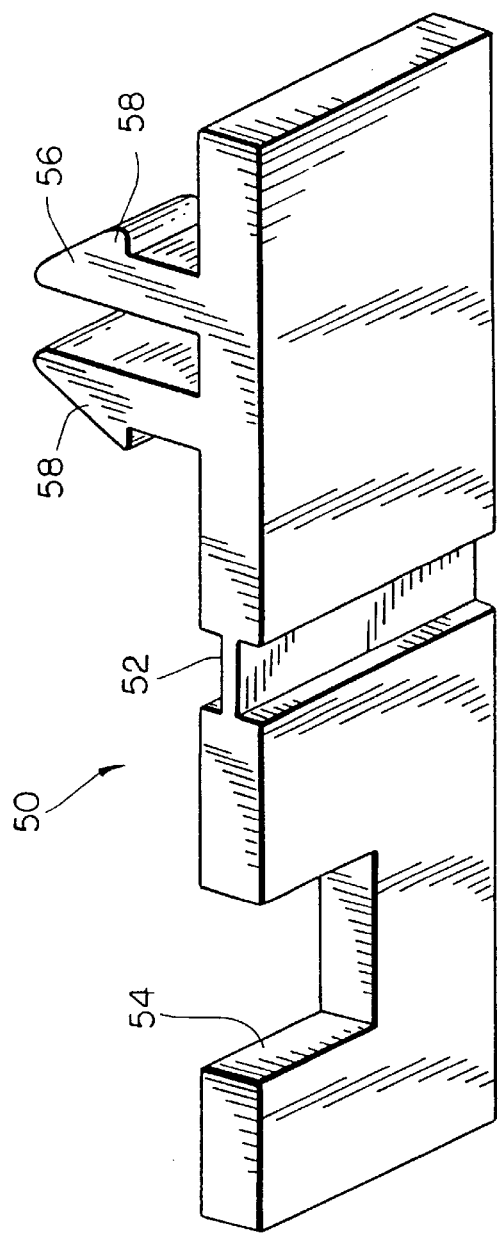
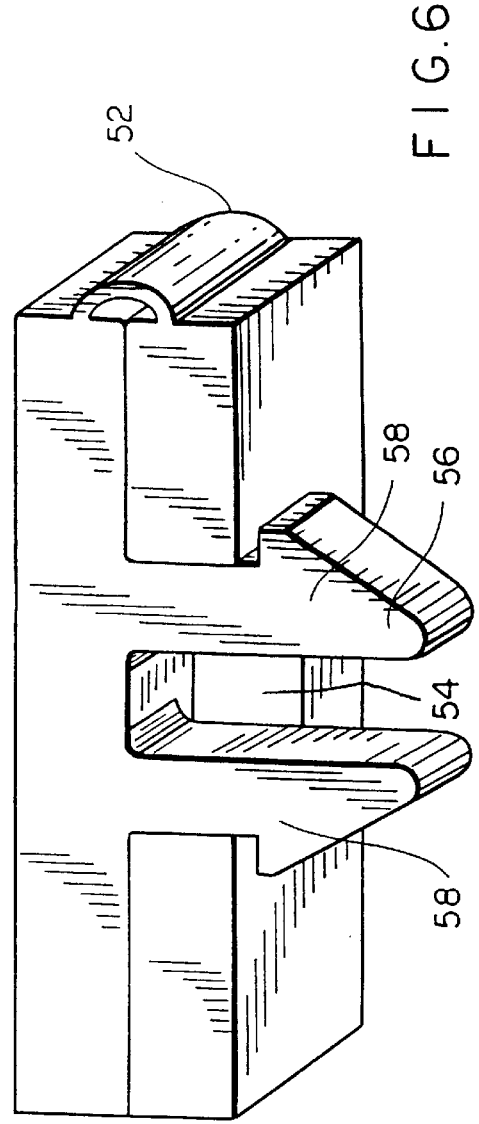

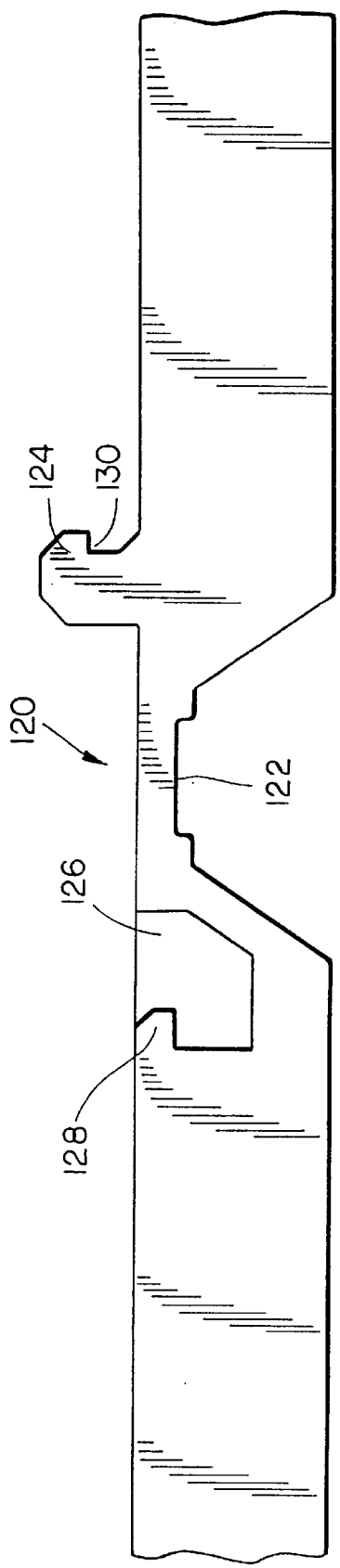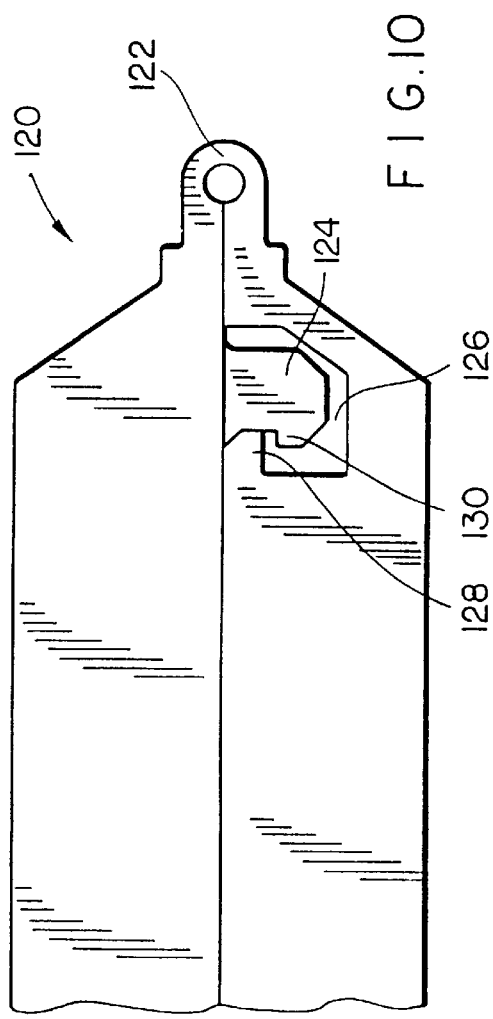

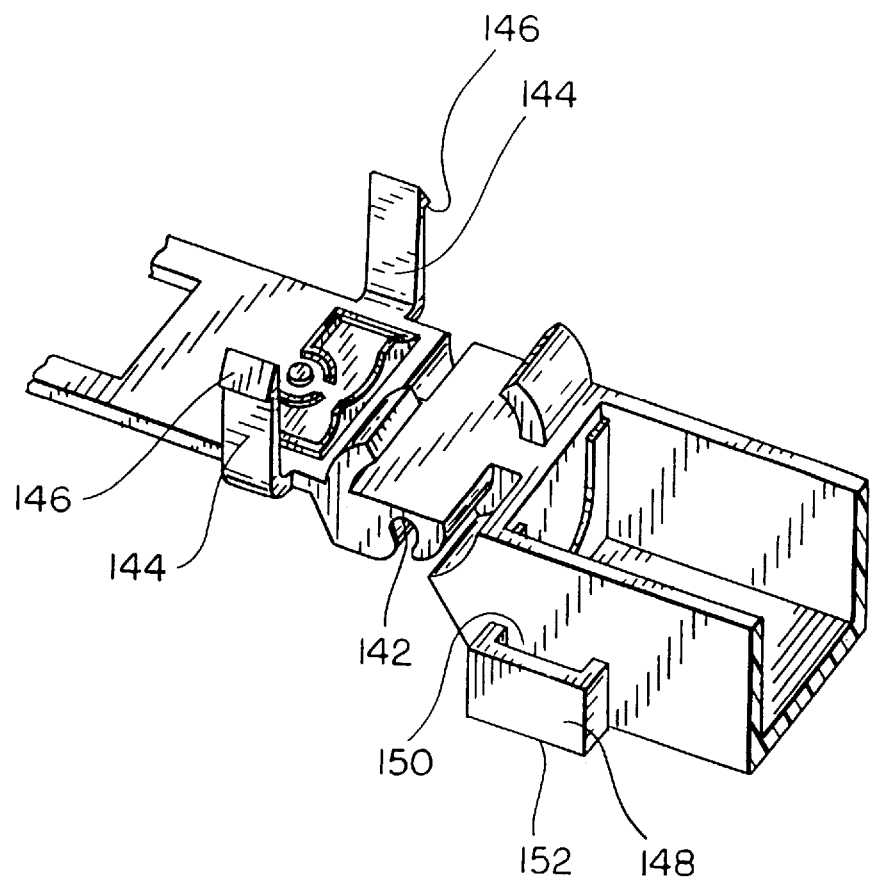
F I G. 11

SIDE LATCHING HINGE MECHANISM

BACKGROUND OF THE INVENTION

1. Field of the Invention

The present invention is directed to a routing clip, and more particularly to such a clip for securing conduits such as piping, sheaths and cables of various kinds to fixed members such as apertured partitions or walls, and is provided with means for positively holding and maintaining the conduits or the like against substantially any movement with respect thereto and still, more particularly, the present invention is directed to a clip of this type which is molded integrally from a plastic material and has a folding hinge. The clip further includes a hinge latch which maintains it in a closed condition should the folding hinge fail upon repeated flexing.

2. Description of the Prior Art

Motor vehicles have numerous conduits whose function is to supply various parts of the vehicle with pressurized fluid, or mechanical or electrical energy. For safety reasons, it is desirable for such tubing or cables to be fixed substantially immobile to vehicle walls or surfaces by means of some suitable support or clamp. Such a support or clamp must not only hold the tubing or cable substantially immobile, but must further be positively secured to the wall or other surface so as to avoid the inadvertent removal thereof due to vibration or other forces encountered when the vehicle is in operation. Prior art supports in the form of securing collars for receiving such tubing or cables by merely clipping thereon have not consistently met these requirements.

For example, U.S. Pat. No. 4,264,047 to Nelson shows a molded one-piece combination safety clamp and fastener apparatus for securing a generally tubular member to an apertured mounting surface. The apparatus includes a collar portion having an inner wall surface for receiving and maintaining substantially without play a tubular element. A clamping portion of the apparatus is integrally hinged to the collar portion and is moveable into engagement with the collar portion for clamping the tubular element therebetween. Cooperating locking structures are associated with the collar and clamping portions for positively locking the collar and clamping portions into engagement about the element. An integral fastener structure having a plurality of coaxially extending shank sections for insertion through an aperture of the mounting surface has a passageway and a pin extending axially therein. The pin element is positioned with respect to the clamping portion so as to cause the fastener to be positively retained, within the mounting surface aperture, upon the hinged movement and engagement of the clamping portion with the collar portion.

The hinged connection is described as being relatively weak, and is further enhanced upon relative hinged movement of the clamping portion into a closed position onto the collar portion by the provision of a hooklike member, referred to in the industry as a banana prong, formed on the clamping portion which engages with a complementary slot or receptacle formed for this purpose in the collar portion. Should the hinge connection fail due to cyclic fatigue, the banana prong, engaged within the slot, prevents the disclosed apparatus from opening at the hinge connection. However, there is no positive interlock between the banana prong and the slot to prevent an apparatus of this type from opening at the hinge connection upon the failure thereof.

U.S. Pat. No. 4,478,381 to Pittion et al. shows an elastic pipe clamp having a lower yoke, a fastener foot or the like for anchoring the lower yoke to a fixed surface and a cooperating upper yoke, the pipe being securely held between the yokes when they are locked together in a positive manner. A hinge-band pivotally connects one end of the upper yoke to one end of the lower yoke, and mutually engaging locking hooks are provided on the opposite ends of the yokes from the hinge band for locking the yokes together. At least two beaks on the hinged end of one of the yokes curve inwardly with respect to and over the hinge-band, the beaks being adjacent to the outer edges of the yoke with their outer arcs being tangent to the inside wall of the yoke. Cooperating recesses are provided in the other yoke that are open on their outer sides and have upper and lower walls with a radius of curvature similar to the curvature of the beaks, whereby the beaks substantially fill the recesses when the clamp is closed. In one of the disclosed embodiments, the so-called beaks, which are essentially banana prongs, have hooks on their outer ends pointing toward the hinge band. The hooks cooperate with catch surfaces on the inner arc of the upper wall of the recesses in the lower yoke. The hooks click into position behind the catch surfaces approximately simultaneously with the mutual engagement of the locking hooks when the upper yoke is closed. In this way, the locking effect of the clamp is further reinforced. It will be observed, however, that in this embodiment, the banana prongs must flex circumferentially, or outwardly along their curvature. As the recesses must be wide enough to accommodate such flexing, there is some freedom of movement between the upper and lower yokes when the hinge band is broken.

The present invention is a routing clip having a hinge latch which locks the upper and lower portions of the clip together in a more positive and effective manner than do those of the prior art.

SUMMARY OF THE INVENTION

Accordingly, the present invention may be viewed as an improvement for a routing clip of this type, wherein the routing clip is a folding hinge clip comprising two halves molded from a synthetic polymeric resin and having a hinge portion about which the two halves of the routing clip are folded so as to contain the conduit. The routing clip is positively latched into a closed position about the conduit by a latch opposite to the hinge portion. The improvement comprises a hinge latch having a male latching member and a female latching member adjacent to and in corresponding positions on opposite sides of the hinge portion on the same side of the routing clip. The male latching member is deflected in a direction transverse to its length when being engaged with the female latching member, in order to effect a more secure connection at the hinge, and to provide a hinge latch that will remain closed in the event that the hinge suffers flex failure. By "transverse" deflection is meant a sideways deflection, either toward and away from the hinge portion or inboard and outboard parallel to the hinge portion.

BRIEF DESCRIPTION OF THE DRAWINGS

The present invention will now be described in more complete detail with frequent reference being made to the several drawing figures identified below.

FIG. 5 is a perspective view of a second embodiment of a hinge latch for a routing clip;

FIG. 6 is a perspective view showing the hinge latch of FIG. 5 in a closed condition;

FIG. 9 is a side plan view of a fifth embodiment of a hinge latch for a routing clip;

FIG. 10 is a side plan view showing the hinge latch of FIG. 9 in a closed condition; and FIG. 11 is a perspective view of a sixth embodiment of a hinge latch for a routing clip.

DETAILED DESCRIPTION OF THE PREFERRED EMBODIMENTS

Figure 1:
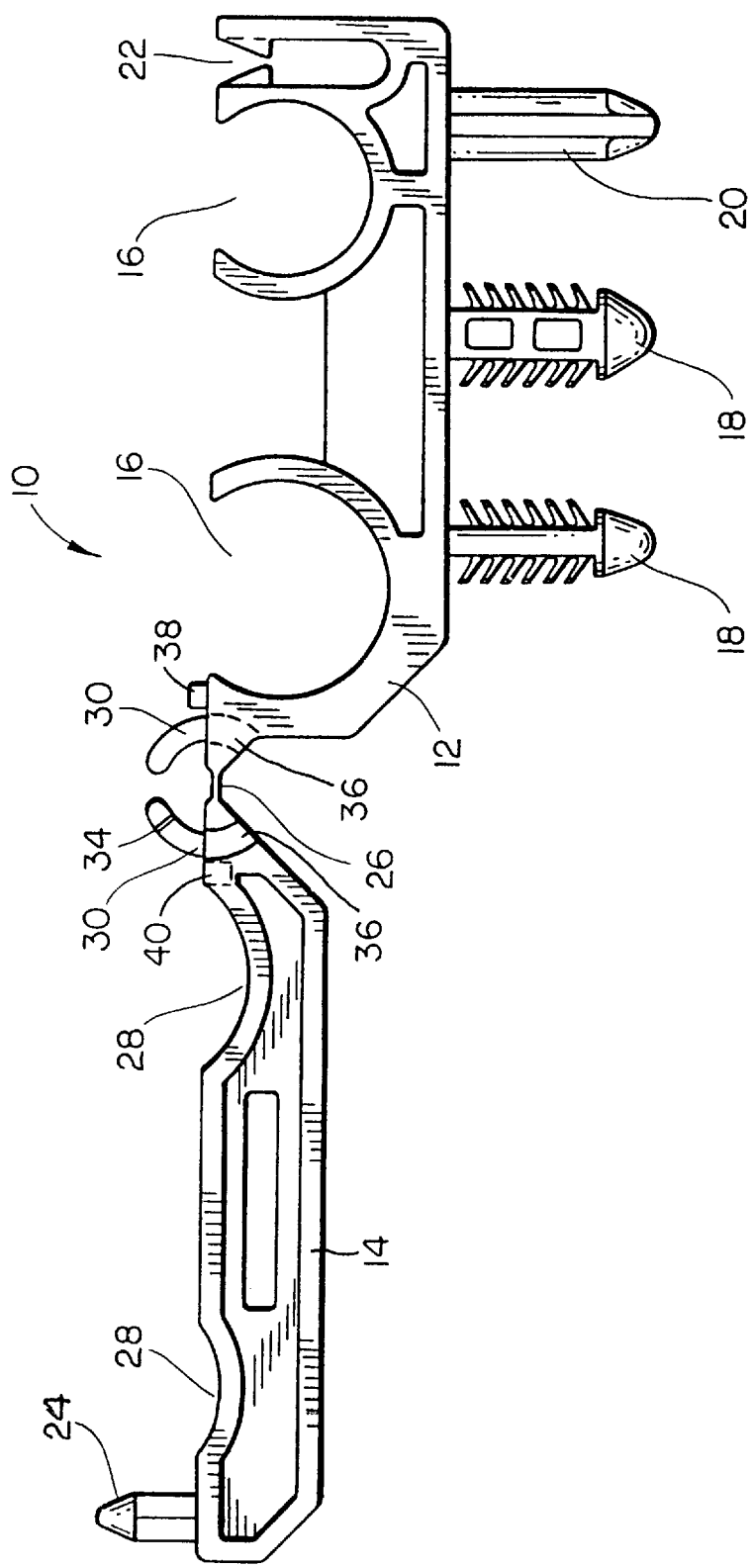
FIG. 1, is a side plan view of a routing clip having a hinge latch according to a first embodiment of the present invention.

Turning now to the figures specifically identified above, FIG. 1 is a side plan view of a routing clip 10 having a hinge latch according to a first embodiment of the present invention. The routing clip 10, which may be more generally referred to as a folding hinge clip, comprises a collar portion 12 and a clamping portion 14. The collar portion 12 includes at least one receptacle 16, wherein a tube, wire or the like may be disposed. Generally, the receptacles 16 are of a cross section such that the item to be disposed therein will be held therein, as by a collar. A typical cross section, as shown, is of an arc greater than a semi-circle. In any event, the receptacle or receptacles 16 provide passages wherein the conduits to be mounted by the routing clip are held.

On the underside of the collar portion 12 are one or more mounting posts 18, 20, of which mounting posts 18 may be flex tree fasteners for mounting the routing clip 10 in holes of appropriate diameters provided in a metal panel or the like. Mounting post 20 may be provided as a further post not having resilient fastening means.

Collar portion 12 further has a female locking member 22, into which male locking member 24 of clamping portion 14 snappingly engages when the clamping portion 14 is folded over onto collar portion 12 about hinge portion 26. Clamping portion 14 has indentations 28 which close receptacles 16 and clamp conduits therein when the clamping portion 14 is closed.

The present invention comprises several different embodiments for a hinge latch for a routing clip 10 of this general type, and it may be assumed in the discussion to follow that the various embodiments of the hinge latch are used with such a routing clip 10, particularly when only the hinge latch is shown in a figure for the sake of clarity.

Returning now to FIG. 1, hinge portion 26 is a thin member separating the collar portion 12 from the clamping portion 14 in the integrally molded routing clip 10. In this regard, it should be noted that routing clips of this type may be molded from any of the synthetic polymeric resins used for this purpose by those of ordinary skill in the art. The thinness of the hinge portion 26 relative to the rest of the routing clip 10 enables the clip 10 to be folded thereabout and used for its intended purpose.

With repeated flexing, however, the hinge portion 26 may fail. The purpose of the present invention is to provide a hinge latch to ensure that the two halves of the routing clip, that is the collar portion 12 and the clamping portion 14 will not separate should this occur.

In FIG. 1, the hinge latch is incorporated into the banana prongs 30 which are often included in routing clips 10 of this type to prevent the two halves from separating. In this first embodiment of the present invention, the banana prongs 30 positively lock to prevent the two halves from separating.

Figure 2:
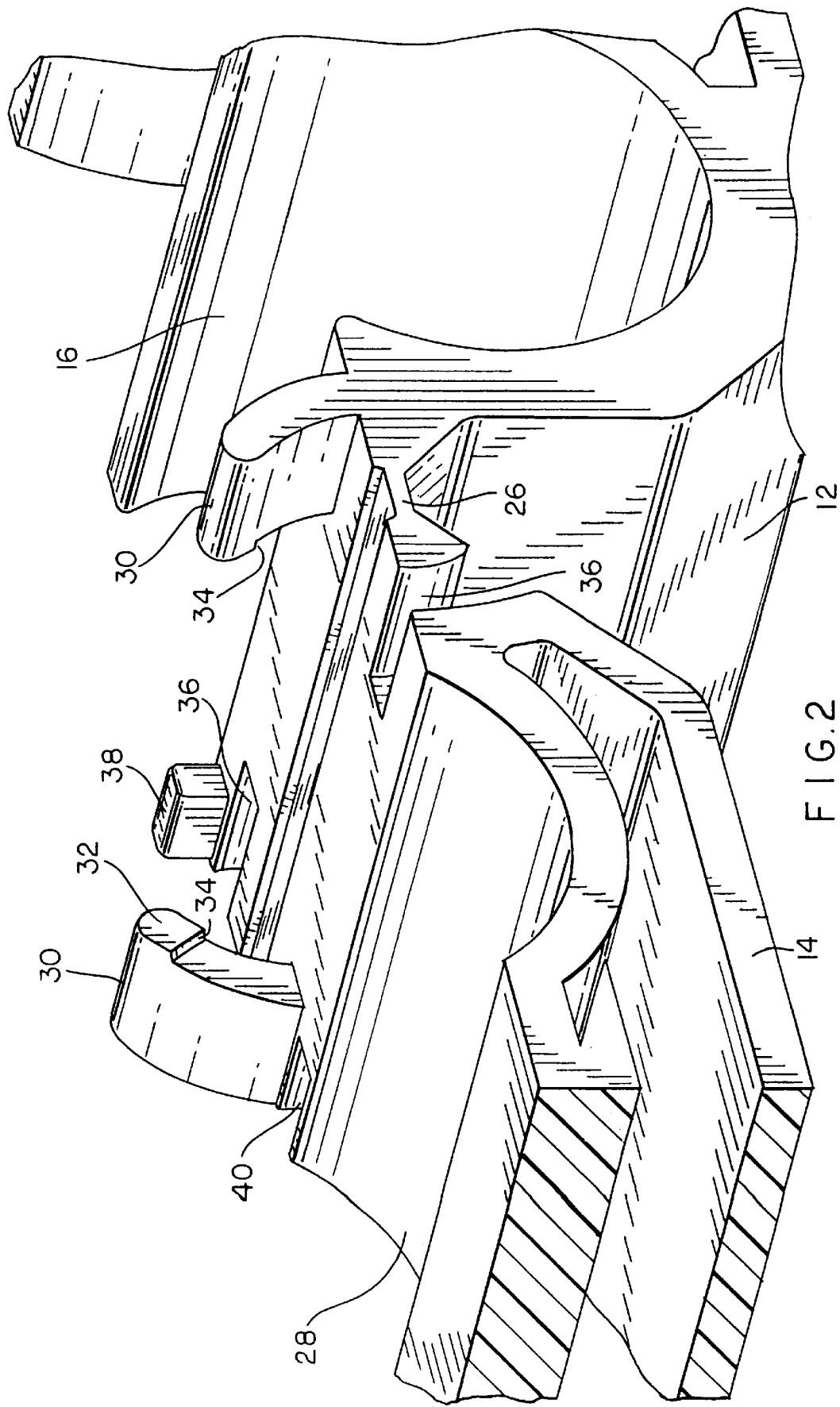
FIG. 2 is a perspective view of the hinge portion of the routing clip shown in FIG. 1.

Turning to FIG. 2, a perspective view of the hinge portion 26 of the routing clip 10 shown in FIG. 1, one or both of the banana prongs 30 are provided with a hinge latch 32 formed by a tooth 34 on the inboard side of the prongs 30, the tooth 34 being a ledge formed by a thickened portion of the banana prong 30. Recesses 36, comprising curved passageways, accommodate banana prongs 30 when clamping portion 14 is folded about hinge portion 26 onto collar portion 12. A guide stud 38 and corresponding niche 40 may also be provided to keep the collar portion 12 and clamping portion 14 aligned, and to keep the collar portion 12 and the clamping portion 14 from sliding relative to one another if the hinge portion 26 fails.

Figure 3:
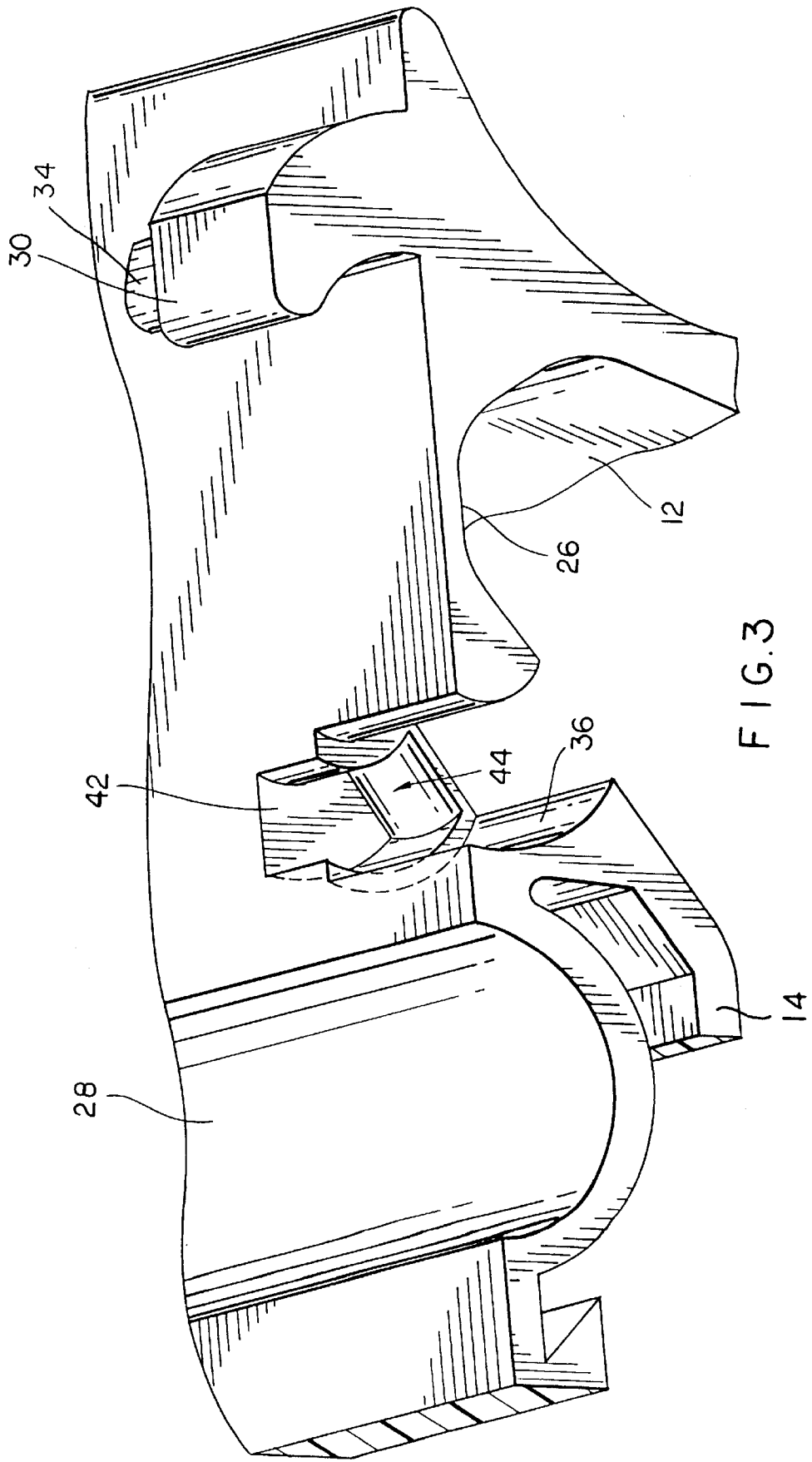
FIG. 3 is a second perspective view of the hinge portion of the routing clip shown in FIG. 1.

FIG. 3, another perspective view of the hinge portion 26 of the routing clip 10, provides further structural detail for the recesses 36. A clearance groove 42 is provided on the inboard side of the recess 36 to accommodate tooth 34. At the bottom of the clearance groove 42 is a latching lip 44 beyond which tooth 34 of banana prong 30 snaps to latch the hinge. In so doing, banana prongs 30 flex from the inboard to the outboard side of the routing clip 10 in a direction parallel to that of the hinge portion 26 as the tooth 34 passes by the latching lip 44. This outboard deflection is not shown by the prior art, and permits the banana prongs 30 and recesses 36 to be closely conformed to one another in shape. It should be noted that, instead of providing a clearance groove 42 and a latching lip 44 on the inboard side of recess 36 to accommodate tooth 34, the depth of recess 36 may gradually decrease to deflect banana prongs 30 gradually outward (outboard) as routing clip 10 is closed, and to allow banana prongs 30 to snap back inwardly (inboard) when tooth 34 clears the recess 36.

Figure 4:
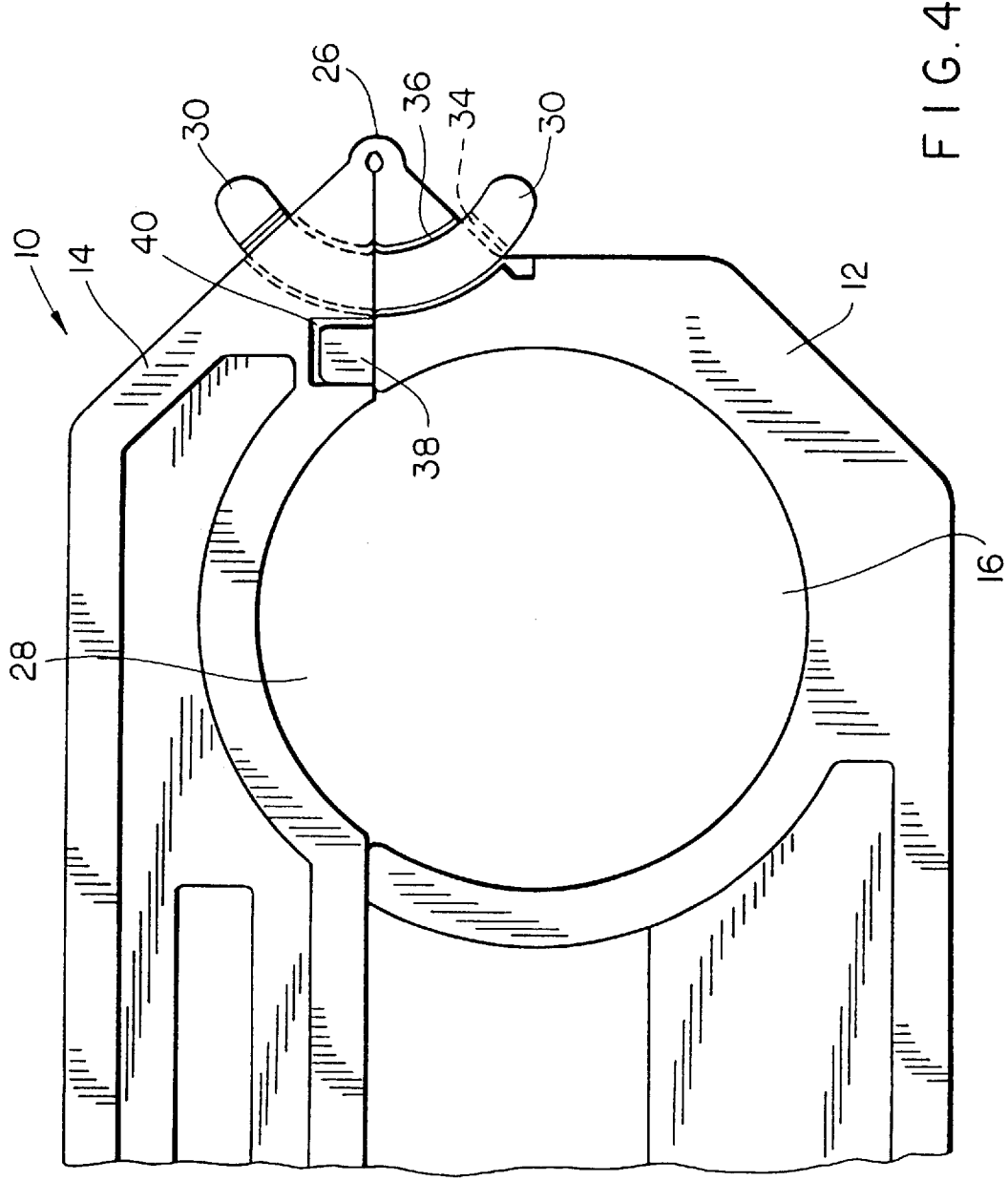
FIG. 4 is a side plan view showing the routing clip of FIG. 1 in a closed condition.

FIG. 4 is a side plan view showing the routing clip 10 of FIG. 1 in a closed condition and, particularly, showing how banana prongs 30 hold collar portion 12 and clamping portion 14 together, even when the hinge portion 26 has failed. It will be noted that receptacle 16 and indentation 28 combine when the routing clip is closed to produce a passage having a circular cross section.

FIG. 5 is a perspective view of a second embodiment of a hinge latch 50 for a routing clip. Like the hinge latch described above, hinge latch 50, and the other hinge latches to be discussed below, is on a side of the routing clip adjacent to hinge portion 52. A slot 54 is provided on one side, or both sides, of the hinge portion 52, and a double-sided tooth 56 having two resilient members 58 is provided on the other side of the hinge portion 52.

FIG. 6 is a perspective view showing the hinge latch 50 of FIG. 5 in a closed condition. When the routing clip which includes hinge latch 50 is folded about hinge portion 52, double-sided tooth 56 engages within slot 54 and locks the routing clip closed. If the hinge portion 52 should fail, the double-sided tooth 56 keeps the two halves of the routing clip locked in place. The two resilient members 58 of double-sided tooth 56 flex in a direction transverse to their lengths when locking into slot 54.

Figure 7:
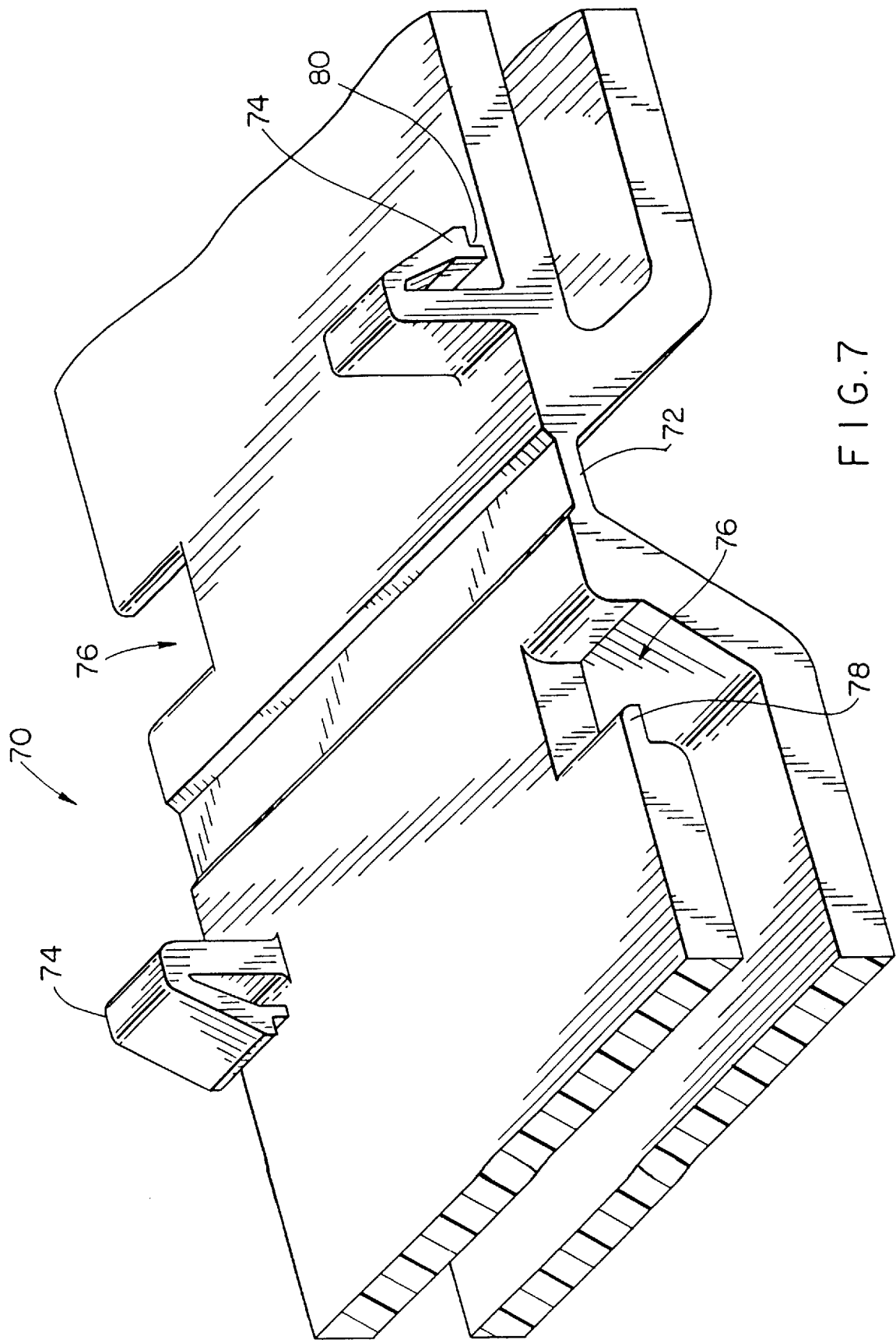
FIG. 7 is a perspective view of a third embodiment of a hinge latch for a routing clip.

FIG. 7 is a perspective view of a third embodiment of a hinge latch 70 for a routing clip. On each side of the routing clip, a single-sided tooth 74 and a slot 76 are provided adjacent to hinge portion 72. The slot 76 has a side lip 78 which matches up with ledge 80 under the tooth 74 when the routing clip is closed. Again, teeth 74 flex in a direction transverse to their lengths when locking into slots 76.

Figure 8:
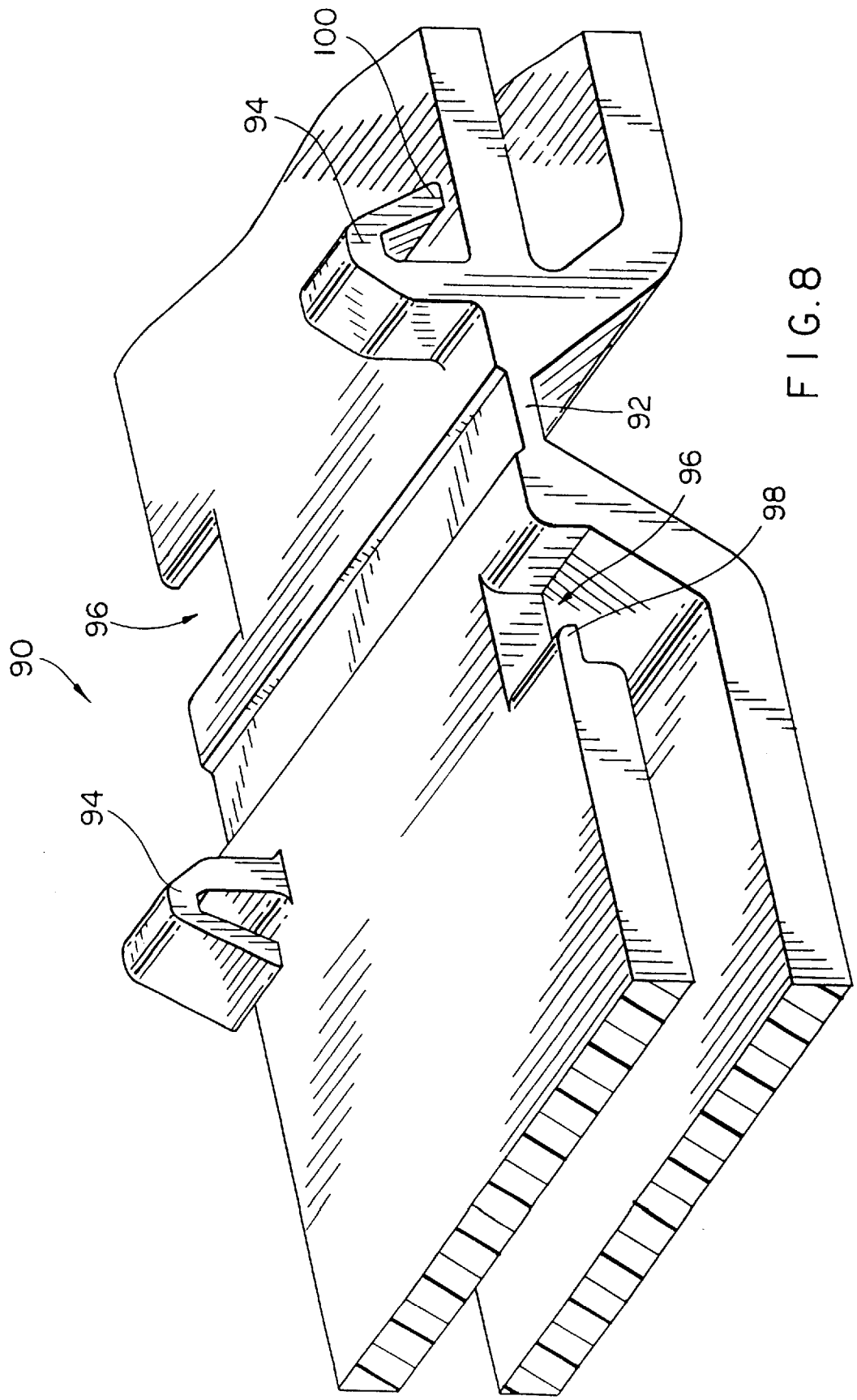
FIG. 8 is a perspective view of a fourth embodiment of a hinge latch for a routing clip.

FIG. 8 is a perspective view of a fourth and similar embodiment of a hinge latch 90 for a routing clip. Again, on each side of the routing clip, a single-sided tooth 94 and a slot 96 are provided adjacent to the hinge portion 92. Again, the slot 96 has a side lip 98 which matches up with ledge 100 under the tooth 94 when the routing clip is closed. Because ledge 100 is not immediately connected to base 102, hinge latch 90 is more resilient than hinge latch 70. Teeth 94 flex in a direction transverse to their lengths when locking into slots 96.

FIG. 9 is a side plan view of a fifth embodiment of a hinge latch 120 for a routing clip. Again, on each side of the routing clip, a single-sided tooth 124 and a slot 126 are provided adjacent to the hinge portion 122. Again, the slot 126 has a side lip 128 which matches up with ledge 130 under the tooth 124 when the routing clip is closed.

FIG. 10 is a side plan view showing the hinge latch 120 of FIG. 9 in a closed condition, where ledge 130 hooks under side lip 128. Teeth 124 flex in a direction transverse to their lengths when locking into slots 126.

Finally, FIG. 11 is a perspective view of a sixth and final embodiment of a hinge latch 140 for a routing clip. On each side of the routing clip adjacent to the hinge portion 142 is a male latching member 144 in the form of an elongated member having a latching tooth 146 at an end of an outboard side thereof. On each side of the routing clip adjacent to but on the other side of the hinge portion 142 is a female latching member 148 comprising a passageway 150 into which a respective male latching member 144 enters when the routing clip is closed. Hinge latch 140 is locked when latching tooth 146 of male latching member 144 extends through passageway 150 and clips onto the bottom 152 of female latching member 148. When this occurs, male latching member 144 snaps outboard of the routing clip in a direction parallel to that of the hinge portion 142.

While the invention has been described hereinabove with reference to preferred embodiments, the present invention is not limited thereto. On the contrary, various changes, modifications or alternatives may become apparent to those skilled in the art upon reading the foregoing descriptions. Accordingly, the present invention is intended to embrace all such changes modifications and alternatives insofar as they fall within the spirit and scope of the appended claims.

What is claimed is:

1. A routing clip for fixing a conduit to a support, comprising:

a pair of members integrally connected together by a hinge portion defining a hinge axis about which said pair of members of said routing clip are folded with respect to each other so as to clampingly contain a conduit therebetween;

means provided upon said pair of members of said routing clip at a location remote from said hinge portion for locking said pair of members in a closed folded state about a conduit so as to retain a conduit therebetween; and a hinge latch for maintaining said pair of members in said closed folded state even if said hinge portion should fail, said hinge latch comprising a first male latching member disposed upon a first one of said pair of members of said routing clip so as to be disposed upon a first side of said hinge portion at a position adjacent to said hinge portion and disposed toward a first axial end of said routing clip, a first female latching member disposed at a position corresponding to that of said first male latching member with respect to said first axial end of said routing clip but upon a second one of said pair of members so as to be disposed upon a second opposite side of said hinge portion at a position adjacent to said hinge portion, a second male latching member disposed upon said second one of said pair of members of said routing clip so as to be disposed upon said second opposite side of said hinge portion at a position adjacent to said hinge portion and disposed toward a second axial end of said routing clip, and a second female latching member disposed at a position corresponding to that of said second male latching member with respect to said second axial end of said routing clip but upon said first one of said pair of members so as to be disposed upon said first side of said hinge portion at a position adjacent to said hinge portion.

2. The routing clip as claimed in claim 1, wherein:

said first and second male latching members comprise banana prongs wherein each one of said banana prongs has a tooth upon an axially inboard side thereof; and said first and second female latching members comprise recesses having a clearance groove so as to respectively accommodate said teeth of said first and second male latching members, wherein each one of said clearance grooves has a latching lip about which said teeth of said banana prongs of said first and second male latching members snappingly engage so as to latch said first and second male and female latching members of said hinge latch, said banana prongs deflecting axially outboard and axially inboard when engaging said female latching members.

3. The routing clip as claimed in claim 1, wherein:

each one of said first and second male latching members comprises a double-sided tooth comprising a longitudinal extent and a pair of resilient members having oppositely facing ledges; and each one of said first and second female latching member comprises a slot, said pair of resilient members of each one of said double-sided teeth of said first and second male latching members flexing transversely with respect to said longitudinal extents when respectively snappingly engaging with said slots of said first and second female latching members.

4. The routing clip as claimed in claim 1, wherein:

each one of said first and second male latching members comprises a single-sided tooth comprising a resilient member having a longitudinal extent and a ledge upon one side thereof; and each one of said first and second female latching member comprises a slot, said resilient member of each one of said single-sided teeth of said first and second male latching members flexing transversely with respect to said longitudinal extents when respectively snappingly engaging with said slots of said first and second female latching members.

5. The routing clip as claimed in claim 1, wherein:

each one of said first and second male latching members comprises an elongated member having a latching tooth disposed upon an axially outboard side thereof; and each one of said first and second female latching members comprises a passageway into which said first and second male latching members respectively enter when said routing clip is closed, each one of said latching teeth respectively clipping onto an end of one of said passageways of said first and second female latching members so as to latch said hinge latch, each one of said first and second male latching members deflecting axially inboard and axially outboard when engaging said passageways of said first and second female latching members.

6. The routing clip as claimed in claim 1, wherein:

each one of said first and second male latching members comprises a banana prong having a tooth disposed upon an axially inboard side thereof; and each one of said first and second female latching members comprises a recess of gradually decreasing depth for respectively accommodating said teeth of said banana prongs of said first and second male latching members and for respectively gradually deflecting said banana prongs axially outwardly therefrom as said routing clip is closed, said banana prongs deflecting axially inwardly when said teeth of said banana prongs clear said recesses of said first and second female latching members so as to latch said hinge latch.

7. The routing clip as set forth in claim 1, wherein:

one of said pair of members comprises at least one receptacle for housing a conduit.

8. The routing clip as set forth in claim 7, wherein:

said at least one receptacle has an arcuate extent which is greater than that of a semi-circle.

9. The routing clip as set forth in claim 8, wherein:

the other one of said pair of members comprises at least one indentation which cooperates with said at least one receptacle of said one of said pair of members so as to define therewith a passage for housing a conduit wherein said passage has a circular configuration.

10. The routing clip as set forth in claim 1, wherein:

said routing clip is fabricated from a synthetic polymeric resin material.

11. A hinge mechanism, comprising:

a pair of members integrally connected together by a hinge portion defining a hinge axis about which said pair of members of said hinge mechanism are folded with respect to each other;

means provided upon said pair of members of said hinge mechanism at a location remote from said hinge portion for locking said pair of members in a closed folded state; and a hinge latch for maintaining said pair of members in said closed folded state even if said hinge portion should fail, said hinge latch comprising a first male latching member disposed upon a first one of said pair of members of said hinge mechanism so as to be disposed upon a first side of said hinge portion at a position adjacent to said hinge portion and disposed toward a first axial end of said hinge mechanism, a first female latching member disposed at a position corresponding to that of said first male latching member with respect to said first axial end of said hinge mechanism but upon a second one of said pair of members so as to be disposed upon a second opposite side of said hinge portion at a position adjacent to said hinge portion, a second male latching member disposed upon said second one of said pair of members of said hinge mechanism so as to be disposed upon said second opposite side of said hinge portion at a position adjacent to said hinge portion and disposed toward a second axial end of said hinge mechanism, and a second female latching member disposed at a position corresponding to that of said second male latching member with respect to said second axial end of said hinge mechanism but upon said first one of said pair of members so as to be disposed upon said first side of said hinge portion at a position adjacent to said hinge portion.

12. The hinge mechanism as claimed in claim 11, wherein:

said first and second male latching members comprise banana prongs wherein each one of said banana prongs has a tooth upon an axially inboard side thereof; and said first and second female latching members comprise recesses having a clearance groove so as to respectively accommodate said teeth of said first and second male latching members, wherein each one of said clearance grooves has a latching lip about which said teeth of said banana prongs of said first and second male latching members snappingly engage so as to latch said first and second male and female latching members of said hinge latch, said banana prongs deflecting axially outboard and axially inboard when engaging said female latching members.

13. The hinge mechanism as set forth in claim 11, wherein:

said hinge mechanism is fabricated from a synthetic polymeric resin material.

14. The hinge mechanism as claimed in claim 11, wherein:

each one of said first and second male latching members comprises a double-sided tooth comprising a longitudinal extent and a pair of resilient members having oppositely facing ledges; and each one of said first and second female latching member comprises a slot, said pair of resilient members of each one of said double-sided teeth of said first and second male latching members flexing transversely with respect to said longitudinal extents when respectively snappingly engaging with said slots of said first and second female latching members.

15. The hinge mechanism as claimed in claim 11, wherein:

each one of said first and second male latching members comprises a single-sided tooth comprising a resilient member having a longitudinal extent and a ledge upon one side thereof; and each one of said first and second female latching member comprises a slot, said resilient member of each one of said single-sided teeth of said first and second male latching members flexing transversely with respect to said longitudinal extents when respectively snappingly engaging with said slots of said first and second female latching members.

16. The hinge mechanism as claimed in claim 11, wherein:

each one of said first and second male latching members comprises an elongated member having a latching tooth disposed upon an axially outboard side thereof; and each one of said first and second female latching members comprises a passageway into which said first and second male latching members respectively enter when said hinge mechanism is closed, each one of said latching teeth respectively clipping onto an end of one of said passageways of said first and second female latching members so as to latch said hinge latch, each one of said first and second male latching members deflecting axially inboard and axially outboard when engaging said passageways of said first and second female latching members.

17. The hinge mechanism as claimed in claim 11, wherein:

each one of said first and second male latching members comprises a banana prong having a tooth disposed upon an axially inboard side thereof; and each one of said first and second female latching members comprises a recess of gradually decreasing depth for respectively accommodating said teeth of said banana prongs of said first and second male latching members and for respectively gradually deflecting said banana prongs axially outwardly therefrom as said hinge mechanism is closed, said banana prongs deflecting axially inwardly when said teeth of said banana prongs clear said recesses of said first and second female latching members so as to latch said hinge latch.

* * * * *